United States Patent
Aida et al.

(10) Patent No.: US 7,631,117 B2
(45) Date of Patent: Dec. 8, 2009

(54) METHOD FOR COMMUNICATING BETWEEN HOST AND STORAGE DEVICE, STORAGE DEVICE, HOST, AND SYSTEM COMPRISING STORAGE DEVICE AND HOST

(75) Inventors: Toru Aida, Kanagawa (JP); Minoru Hashimoto, Kanagawa (JP); Nobuyuki Matsuo, Shiga (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 307 days.

(21) Appl. No.: 11/259,436

(22) Filed: Oct. 25, 2005

(65) Prior Publication Data

US 2006/0095693 A1 May 4, 2006

(30) Foreign Application Priority Data

Oct. 29, 2004 (JP) .............................. 2004-316954

(51) Int. Cl.
*G06F 3/00* (2006.01)
*G06F 13/28* (2006.01)
(52) U.S. Cl. .......................................... 710/50; 710/22
(58) Field of Classification Search ............... 710/22, 710/50; 711/154
See application file for complete search history.

(56) References Cited

U.S. PATENT DOCUMENTS 6,457,072 B1 * 9/2002 Fairman ...................... 710/22
2004/0194097 A1 * 9/2004 Spencer ..................... 718/100

FOREIGN PATENT DOCUMENTS

EP 0458756 * 4/1991
JP 2001-312373 A 11/2001

* cited by examiner

*Primary Examiner*—Henry W. H. Tsai
*Assistant Examiner*—Hyun Nam
(74) *Attorney, Agent, or Firm*—Townsend and Townsend and Crew LLP; Patrick Duncan

(57) ABSTRACT

Embodiments of the invention improve the efficiency of communication processing between a host and a storage device. In one embodiment, a data processing system includes a storage device and a host. The host gives the storage device an instruction to perform specified processing, and an instruction as to whether or not a completion notification of the instructed processing is to be transmitted to the host. If the host instructs the storage device to transmit a processing completion notification, the storage device transmits the completion notification to the host. On the other hand, if the host instructs the storage device not to transmit a processing completion notification, the storage device does not transmit the completion notification to the host.

12 Claims, 10 Drawing Sheets

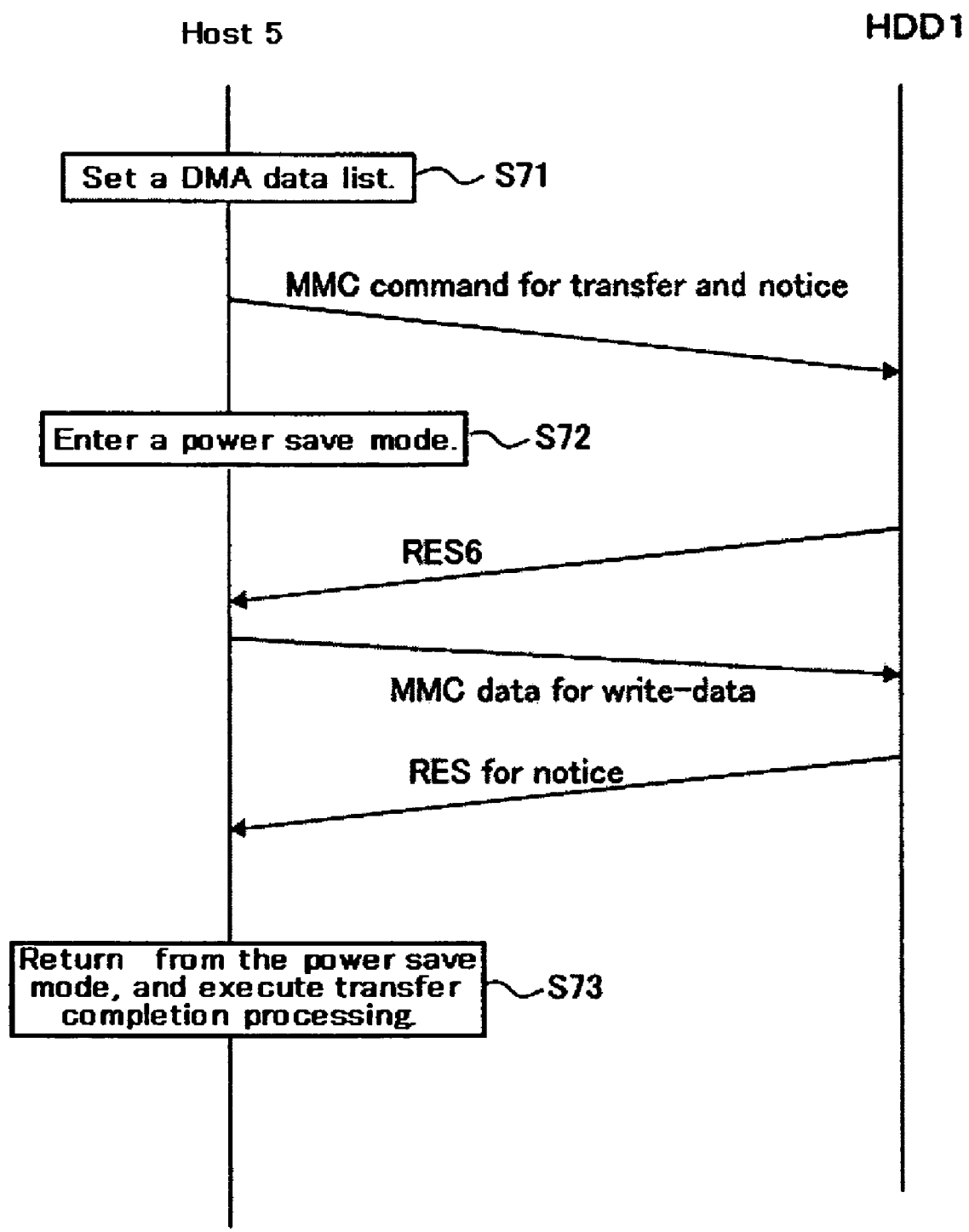

METHOD FOR COMMUNICATING BETWEEN HOST AND STORAGE DEVICE, STORAGE DEVICE, HOST, AND SYSTEM COMPRISING STORAGE DEVICE AND HOST

CROSS-REFERENCES TO RELATED APPLICATIONS

This application claims priority from Japanese Patent Application No. JP2004-316954, filed Oct. 29, 2004, the entire disclosure of which is incorporated herein by reference.

BACKGROUND OF THE INVENTION

The present invention relates to communications between a host and a storage device, and more particularly to a completion notification of processing transmitted from the storage device to the host.

Devices using various types of media such as optical disks and magnetic tapes are known as storage devices. Among them, hard disk drives (hereinafter referred to as "HDD") have become popular as storage devices for computers to such an extent that they are one of the storage devices indispensable for today's computer systems. Further, not limited to computers, their application is widening more and more because of the superior characteristics with the advent of moving picture recording/reproducing devices, car navigation systems, portable terminals, and removable memories for digital cameras and so on.

A magnetic disk used in the HDD has a plurality of tracks that are concentrically formed. Each track is divided into a plurality of sectors. Address information of a sector, and user data, are written to each sector. Accessing a desired sector by a head element according to the address information of the sector makes it possible to write data to the sector or to read data from the sector. A signal read out from a magnetic disk by the head element through data read processing is subjected to waveform shaping, decoding processing and other prescribed signal processing by a signal processing circuit before the signal is transmitted to a host. Data transmitted from the host is also subjected to prescribed processing by the signal processing circuit in like manner before the data is written to the magnetic disk.

As an interface used for data transmission between the host and the HDD, protocols such as the SCSI protocol and the ATA protocol are in general used. In particular, the ATA protocol is used in many computers with the object of improving interface functions and achieving low cost. In addition, the ATA protocol is broadly used also as interfaces of other types of storage devices such as optical disk storage devices.

As far as the ATA protocol is concerned, a HDD is provided with a function of notifying a host of the completion of input-output (I/O) processing of write and read as user data input-output processing. The host may set this function ON or OFF at the time of starting the HDD. If this function is brought into an ON state, the HDD transmits to the host a completion notification of I/O processing every time I/O processing is completed. Incidentally, as for the completion notification of I/O processing, patent document 1 (Japanese Patent Application Laid-Open No. 2001-312373) discloses the technology for improving the performance of a HDD, for example, by controlling the issuance of a command complete signal to a command.

BRIEF SUMMARY OF THE INVENTION

As described above, in the conventional ATA protocol, the function of transmitting a completion notification of I/O processing from the HDD to the host is implemented in the HDD. However, once the function of transmitting a completion notification of I/O processing is brought into the ON state, the HDD transmits a completion notification every time I/O processing is completed regardless of the kind of processing or the situation. Therefore, depending on the kind of processing or the situation, the completion notification of processing may cause a decrease in processing speed of a system comprising the host and the HDD, or an increase in power consumption of the system.

In the meantime, what is required with the expansion of the use of HDDs is to connect the HDDs to interfaces that are not used in the past. As an example, it may be necessary to connect a HDD to the MMC (Multi Media Card (registered trademark)) interface. The MMC is a storage device that uses a flash memory. The MMC is basically used to store data in portable/small-size information equipment such as a cellular phone and a portable player. A HDD which may be miniaturized, and the storage capacity of which is large, is a storage device that is suitable for the above-mentioned use.

The conventional HDDs are ATA devices that follow the ATA protocol. For the purpose of effectively making use of the functions realized in this ATA, it is desired that the MMC interface be used to achieve data communications between the host and the HDD that is an ATA device. In other words, what is required is to implement the ATA protocol as a logical layer on the MMC protocol. Moreover, even for the MMC protocol, a technology for controlling the completion notification of I/O processing is required to improve the processing efficiency of a system (from the viewpoint of the processing speed or the power consumption).

The present invention was devised taking the above situations into consideration. A feature of the present invention is to improve the efficiency of communication processing performed between a storage device and a host. The above-mentioned and other features of the present invention, and new features thereof, will be made clear by description in this specification and with reference to attached drawings.

According to a first aspect of the present invention, there is provided a communication method for communicating between a host and a storage device, including the steps of: transmitting from the host to the storage device an instruction to perform processing; on the basis of the processing, determining by the host whether or not the storage device is to transmit a completion notification of the processing to the host; and transmitting from the host to the storage device an instruction as to whether or not the storage device is to transmit the completion notification to the host, the instruction being based on the determination. Because, on the basis of processing, the host controls an instruction as to whether or not a completion notification of the processing is to be transmitted from the storage device to the host, it is possible to improve the efficiency of communication processing between the host and the storage device. Moreover, if the host instructs the storage device to transmit the completion notification, the storage device transmits the completion notification of the processing to the host.

It is desirable that the instruction to perform the processing, and the instruction as to whether or not to transmit the completion notification, be included in one command when the instructions are transmitted from the host to the storage device. This makes it possible to reduce the amount of transferred data.

It is desirable that the completion notification include an end reason of the processing. This enables the host to know the end reason, and thereby to omit additional processing therefor.

One desirable example is that on the basis of the processing time of the processing in the storage device, the host determines whether or not to transmit the completion notification. Another desirable example is that the processing time is determined according to the amount of transferred data because the processing is I/O processing.

According to a second aspect of the present invention, there is provided a storage device that performs data communications with a host, including: a receiving unit for receiving from the host an instruction to perform processing, and an instruction as to whether or not to transmit a completion notification of the processing to the host; a control unit for making a determination as to whether or not to transmit the completion notification; and a transmission unit for, if the control unit determines that the completion notification needs to be transmitted, transmitting the completion notification to the host on the completion of the processing. Controlling the transmission of the processing completion notification according to an instruction from the host makes it possible to improve the efficiency of communication processing between the host and the storage device.

It is desirable that the completion notification include an end reason of the processing. This enables the host to know the end reason, and thereby to omit additional processing therefor. In addition, it is desirable that the instruction to perform the processing, and the instruction as to whether or not to transmit the completion notification, be included in one command which the receiving unit receives. This makes it possible to reduce the amount of transferred data.

According to a third aspect of the present invention, there is provided a host that performs data communications with a storage device, including: a control unit for determining, on the basis of processing, whether or not the storage device is to transmit a completion notification of the processing to the host; a transmission unit for transmitting to the storage device, an instruction to perform the processing, and an instruction as to whether or not to transmit the completion notification, which is based on the determination; and a receiving unit for receiving the completion notification that is transmitted from the storage device according to an instruction to transmit the completion notification. Because, on the basis of processing, the host controls an instruction as to whether or not a completion notification of the processing is to be transmitted from the storage device to the host, it is possible to improve the efficiency of communication processing between the host and the storage device.

It is desirable that the transmission unit include the instruction to perform the processing, and the instruction as to whether or not to transmit the completion notification in one command when transmitting the instructions. This makes it possible to reduce the amount of transferred data.

It is desirable that the completion notification include an end reason of the processing. This enables the host to know the end reason, and thereby to omit additional processing therefor. Whether or not to transmit the completion notification is determined on the basis of the power consumption in the host at the time of executing the processing.

One desirable example is that on the basis of the execution time of the host, required to execute the processing, the host determines whether or not to transmit the completion notification.

Because the processing is I/O processing, it is desirable that if it is requested to transmit the completion notification of the processing, a DMA data transfer method be used, whereas if it is not requested to transmit the completion notification of the processing, a polling method be used. This makes it possible to efficiently control processing executed by a processor of the host in response to the processing.

It is desirable that if it is requested to transmit the completion notification of the processing, the control unit enter a power save mode under predetermined conditions, and in response to the completion notification, the control unit return from the power save mode. This makes it possible to reduce the power consumption.

According to a fourth aspect of the present invention, there is provided a system including a host and a storage device that communicate with each other, the system including: the host that determines, on the basis of processing, whether or not the storage device is to transmit a completion notification of the processing, and that transmits to the storage device, an instruction to perform the processing, and an instruction as to whether or not to transmit the completion notification, which is based on the determination; and a storage device that executes the instructed processing, and that transmits the completion notification to the host if the host instructs to transmit the completion notification. Because, on the basis of processing, the host controls an instruction as to whether or not a completion notification of the processing is to be transmitted from the storage device to the host, it is possible to improve the efficiency of communication processing between the host and the storage device.

According to the present invention, it is possible to improve the efficiency of communication processing performed between a storage device and a host.

BRIEF DESCRIPTION OF THE DRAWINGS

FIG. 10 is a sequence diagram illustrating data communications between a host and a HDD for a case where the DMA data transfer method is adopted in write processing.

DETAILED DESCRIPTION OF THE INVENTION

Figure 1:
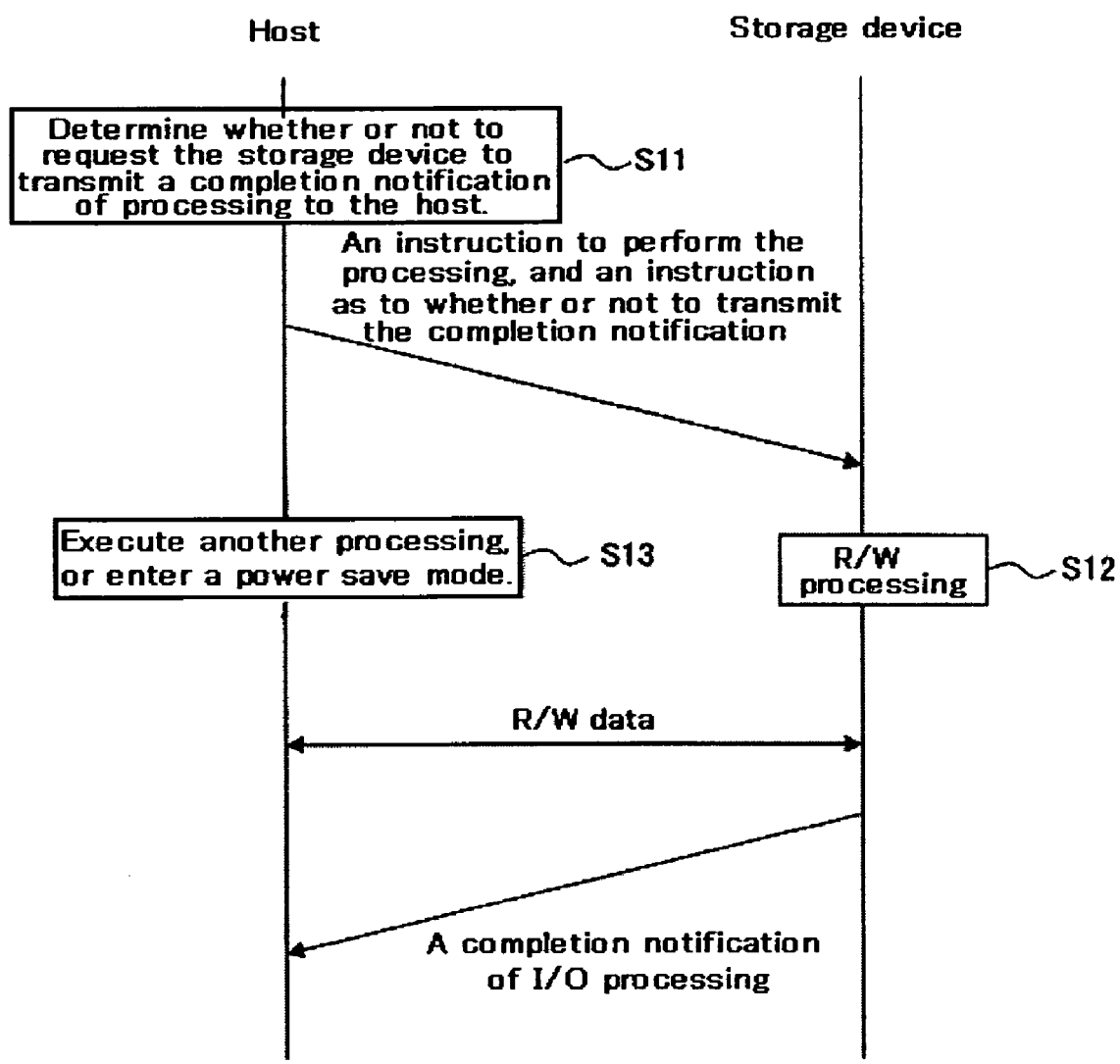
FIG. 1 is a sequence diagram illustrating data communications between a host and a storage device according to an embodiment of the present invention.

Embodiments of the present invention will be described as below. For clarification of the explanation, omission and simplification are made, where appropriate, in the following description and drawings. Also note that identical reference numerals are used to designate identical elements that are common to the figures and redundant description is omitted as appropriate for clarification of the explanation.

A data processing system according to an embodiment comprises a storage device and a host. The host gives the storage device an instruction to perform specified processing, and an instruction as to whether or not a completion notification of the instructed processing is to be transmitted to the host. On the completion of the processing, according to the instruction from the host, the storage device selectively transmits the completion notification to the host. To be more specific, if the storage device is instructed to transmit a completion notification, the storage device transmits the completion notification to the host. If the storage device is instructed not to transmit a completion notification, the storage device does not transmit the completion notification to the host. Because, on the basis of processing, the host controls the instruction as to whether or not a completion notification of the processing is to be transmitted from the storage device to the host, it is possible to improve the efficiency of the processing. If the completion notification from the storage device is not requested, polling processing, or the like, enables the host to know the completion of the processing in the storage device if necessary.

A typical processing which the host instructs the storage device is user data input/output (I/O processing). To be more specific, the user data input/output includes: reading user data from a medium included in the storage device; and writing user data to the medium. Read data from the medium is transmitted to the host through a transmission line. Write data from the host is transmitted to the storage device through the transmission line before the write data is written to the medium.

Communication processing between the host and the storage device according to this embodiment, which is performed in the I/O processing (read/write processing), will be described with reference to a sequence diagram in FIG. 1. Incidentally, the control of the notification that processing has been completed is in particular useful for input-output (I/O) processing of user data. In addition, the control may also be applied to processing that does not include transmission of user data. More specifically, the control may also be applied to, for example, a case where a self-diagnosis test of the storage device is carried out for a long time. What will be described here is an example in which the host requests the storage device to transmit a completion notification to the host.

When instructing the storage device to perform read/write processing, the host determines whether or not to request the storage device to notify the host of the completion of the processing (S11). In this case, according to a predetermined criterion, the host makes the determination as to whether or not to request the storage device to notify the host of the completion. The criterion of determination will be described later. After making the determination as to whether or not to request the completion notification, the host gives the storage device an instruction to perform read/write processing (execution instruction), and an instruction to transmit to the host a completion notification of processing (instruction of completion notification). It is desirable that the instruction of completion notification be transmitted to the storage device together with the instruction to execute read/write processing as one command. Transmitting these instructions to the storage device as one command makes it possible to reduce the overhead required for the instruction to transmit the completion notification of processing, and to reduce the amount of data transmitted through the transmission line between the host and the storage device.

As soon as the storage device receives the command including the instruction to perform read/write processing, the processing of reading/writing data is executed according to the instruction (S12). At the time of read processing, the storage device reads out data at a specified address on a medium, and then transmits the data to the host. In another case, when a cache hit occurs, data stored in a cache is transmitted to the host. At the time of write processing, data is transmitted from the host to the storage device, and is then stored in a buffer of the storage device.

For example, if data transmission by DMA is supported in the host and the storage device, a processor of the host is not required to perform data transmission processing. Accordingly, during the transmission of user data between the host and the storage device, the processor of the host may execute another processing, or may enter a power save mode (S13). This makes it possible to improve the throughput of the processor, and to reduce the power consumption, resulting in efficient processing of the processor.

After the data transmission between the host and the storage device ends, as soon as the read/write processing is completed, the storage device notifies the host of the completion of the read/write processing. End of processing includes not only the completion of read/write processing, which is normal end of read/write processing, but also a case where processing is interrupted as a result of an error that occurred during the processing. Typically, in the case of read processing, processing is completed when transmission of user data from the storage device to the host ends. In the case of write processing, if a write cache stays in an ON state, the write processing ends when transmission of write data from the host to the storage device is completed; and if the write cache stays in an OFF state, the write processing ends when writing of write data to a medium is completed. On the receipt of the completion notification of the read/write processing from the storage device, the host executes postprocessing corresponding to it, and then processing in a system ends.

What was described above is a sequence of receiving from the storage device the completion notification of processing. However, if it is determined that the host does not request the completion notification, the completion notification is not transmitted to the host. As one of preferable examples, on the basis of the processing time of the storage device, the host determines whether or not to request the completion notification. In the read/write processing described above, it is possible to estimate the processing time, for example, by making use of the amount of transmitted data.

If the expected processing time of the storage device is longer than the predetermined reference time, the host requests the storage device to transmit to the host a completion notification of processing. While the storage device executes the processing, if the host executes another processing, it is possible to improve the processing efficiency of the whole system. In another case, the host (processor) may also enter the power save mode while the storage device executes the processing. This makes it possible to reduce the power consumption of the host and that of the system.

On the other hand, if the expected processing time is shorter than the predetermined reference time, the host does not request the storage device to transmit the completion notification to the host so that the total processing is simplified. For example, when entering the power save mode, the overhead for changing modes occurs. In addition, the overhead also occurs when requesting the storage device to transmit the completion notification of processing which the host has instructed. If the processing time of the storage device is short, the reducible amount of power consumption is small.

The processing efficiency, therefore, is improved by simplifying the total processing without requesting the storage device to transmit the completion notification of processing.

As another preferable example, it is possible to control the completion notification of processing on the basis of the expected processing time of processing on the host side. What will be described next is a case where the host may select either the use of the completion notification from the storage device or the use of polling. Here, input-output processing (I/O processing) of user data between the storage device and the host will also be described.

When requesting the storage device to transmit a completion notification of I/O processing, the host performs data transfer by means of DMA. Here, the length of time required for start processing, and end processing, of the data transfer by means of DMA is denoted as Tdma. The start processing of the data transfer by DMA includes: creating a data list containing a memory address of a destination and the amount of transferred data, which are used by a DMA controller; and giving the address in the data list to the DMA controller. The end processing of the data transfer DMA includes: checking a completion status of the DMA controller; and releasing the created list used for data transfer.

Additionally, the length of time required only for transferring data by DMA is denoted as Tdmablk; and the length of time required for data transfer by polling is denoted as Tpioblk. Because the polling is executed according to a command of the processor, it is thought that the length of time required for the start processing, and the end processing, of the polling is 0. Accordingly, the processing time T1 of the command as a whole, for the case where the completion notification of I/O processing is used, is expressed as: T1=(Tdma+Tdmablk). On the other hand, the processing time T2 of the command as a whole, for the case where polling is used, is expressed as: T2=Tpioblk. The host calculates (Tdma+Tdmablk) and Tpioblk on the basis of the amount of transferred data in the I/O processing.

If the processing time of the command as a whole, for the case where the completion notification of I/O processing is used, is shorter than the length of time required for data transfer by polling (T1<T2), the host selects data transfer by DMA. If the length of time required for data transfer by polling is shorter than the processing time of the command as a whole for the case where the completion notification of I/O processing is used (T2<T1), the host selects data transfer by polling. If the processing time of the command as a whole, for the case where the completion notification of I/O processing is used, is equivalent to the length of time required for data transfer by polling (T1=T2), it is possible to select processing that is the same as the last command, or to select arbitrary processing. This makes it possible to shorten the processing time of the command, resulting in an improvement in throughput.

As another example, on the basis of the power consumption, the host may select either the data transfer by DMA or the data transfer by polling. The power consumption per time of the processor in a processing state is denoted as Pmpu. The power consumption of the DMA controller during DMA data transfer is denoted as Pdma. The power consumption of the processor in a state in which the processor is waiting for the completion notification of I/O processing is denoted as Pmpui.

The power consumption P1 of the command as a whole, for the case where the completion notification of I/O processing is used, may be expressed as: P1=(Pmpu×Tdma+Pdma×Tdmablk+Pmpu×Tdmablk). On the other hand, the power consumption P2 of the command as a whole, for the case where polling is used, may be expressed as: P2=(Pmpu×Tpioblk).

If the power consumption for the case where the completion notification of I/O processing is used is smaller than the power consumption for the case where polling is used (in other words, if P1<P2), the host selects the data transfer that uses the completion notification of I/O processing. On the other hand, if the power consumption for the case where polling is used is smaller than that for the case where the completion notification of I/O processing is used (in other words, if P2<P1), the host selects the data transfer that uses polling. This makes it possible to reduce the power consumption during the data transfer. Incidentally, if the power consumption for the case where the completion notification of I/O processing is used is equivalent to that for the case where polling is used (in other words, if P1=P2), it is possible to select processing that is the same as the last command, or to select arbitrary processing.

Here, in response to the situation, the host may dynamically select the criterion of determination (algorithm) as to whether or not to request the completion notification of the instructed processing. For example, if a load on the host is light, the host selects a command execution method in which the power consumption is low. In contrast to this, in the situation in which a higher priority is given to the response time, the host selects a command execution method characterized by the short processing time. As a result, the reduction in power consumption of the whole system may be compatible with the improvement in processing performance.

As described above, in the system of this embodiment, the host instructs the storage device to perform I/O processing, or the like, and determines, on the basis of the instructed processing, whether or not to request the completion notification of the instructed processing. This communication control is in particular useful for the MMC (MultiMediaCard (registered trademark)) protocol. What will be described next is an example in which a communication control method according to this embodiment is applied to the MMC protocol. In particular, an example in which the host establishes communications with an ATA device through a MMC bus will be described. A case where a hard disk drive (HDD) is used as a typical ATA device will be described.

Figure 2:
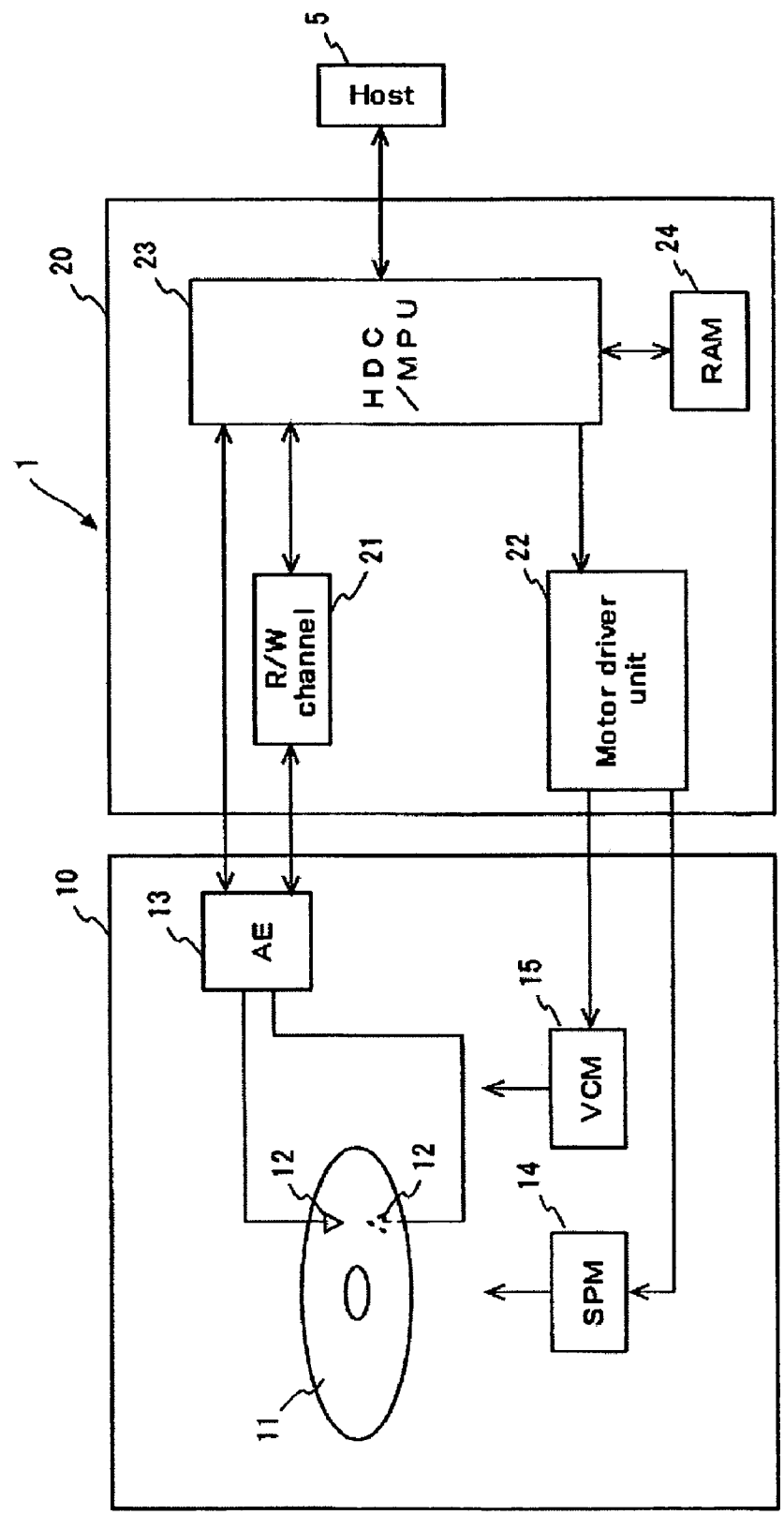
FIG. 2 is a block diagram schematically illustrating a configuration of a HDD that is an example of a storage device according to an embodiment of the invention.

To begin with, a total configuration of a HDD which is a typical ATA device will be briefly described. FIG. 2 is a block diagram schematically illustrating a configuration of a data processing system comprising a HDD 1 and a host 5 according to this embodiment. As shown in FIG. 2, the HDD 1 comprises a sealed enclosure 10, which houses: a magnetic disk 11 that is an example of a medium; a head element 12; arm electronics (arm electronics: AE) 13; a spindle motor (SPM) 14; and a voice coil motor (VCM) 15.

The HDD 1 also comprises a circuit board 20 that is secured outside the enclosure 10. On the circuit board 20, there are provided ICs including: a read/write channel (R/W channel) 21; a motor driver unit 22; a hard disk controller (HDC)/MPU integrated circuit (hereinafter referred to as "HDC/MPU") 23; and a RAM 24 that is an example of a memory. Each circuit may be integrated into one IC, or may also be implemented by dividing the circuit into a plurality of ICs. The SPM 14 rotates the magnetic disk 11 at specified speed. The motor driver unit 22 drives the SPM 14 according to control data sent from the HDC/MPU 23. Pivotal movement of the VCM 15 causes the head element 12 to move over the magnetic disk 11. The motor driver unit 22 drives the VCM 15 according to control data sent from the HDC/MPU 23.

Write data from the host 5 is received by the HDC/MPU 23, and is sent through the R/W channel 21 and the AE 13 before the write data is written to the magnetic disk 11 by the head element 12. In addition, data stored on the magnetic disk 11 is read out by the head element 12, and this read data is sent through the AE 13 and the R/W channel 21 before the read data is output from the HDC/MPU 23 to the host 5.

The AE 13 selects from among the plurality of head elements 12 one head element 12 that is used to access data, and amplifies (preamplifies) at constant gain a read signal read by the selected head element 12, before transmitting the amplified signal to the R/W channel 21. In addition, the AE 13 sends a write signal, which is received from the R/W channel 21, to the selected head element 12.

The R/W channel 21 performs write processing of data transferred from the host 5. In the write processing, the R/W channel 21 performs code modulation of write data supplied from the HDC/MPU 23, and then converts the code-modulated write data into a write signal (electric current) to supply the write data to the AE 13. In the meantime, when supplying data to the host 5, read processing is performed. In the read processing, the R/W channel 21 amplifies a read signal supplied from the AE 13 so that the amplitude is kept constant, and then extracts data from the obtained read signal to perform decode processing. Data which is read out includes user data and servo data. The decoded read data is supplied to the HDC/MPU 23.

The HDC/MPU 23 is a circuit made by integrating a MPU and a HDC into one chip. The MPU operates according to a microcode loaded into the RAM 24. When the HDD 1 is started, not only microcodes to operate on the MPU but also data required for control and data processing are loaded into the RAM 24 from the magnetic disk 11 or a ROM (not shown in the figure). The HDC/MPU 23 executes processing required for data processing such as positioning control of the head element 12, interface control, and defect control, and also executes the total control of the HDD 1.

The HDC/MPU 23 has an interface function of interfacing with the host 5. Using the interface function, the HDC/MPU 23 receives user data, and commands such as a read command and a write command, which are transmitted from the host 51. The received user data is transferred to the R/W channel 21. Further, read data, which has been read from the magnetic disk, is acquired by the R/W channel 21, and is then transmitted to the host 51. As described above, the interface of this embodiment is connected to the MMC bus. This point will be described later.

The data read out by the R/W channel 21 includes not only the user data but also servo data. The HDC/MPU 23 uses the servo data to perform positioning control of the head element 12. Control data from the HDC/MPU 23 is output to the motor driver unit 22. The motor driver unit 22 supplies the VCM 15 with driving current in response to a control signal. Moreover, the HDC/MPU 23 uses the servo data to control processing of reading/writing data.

Figure 3:
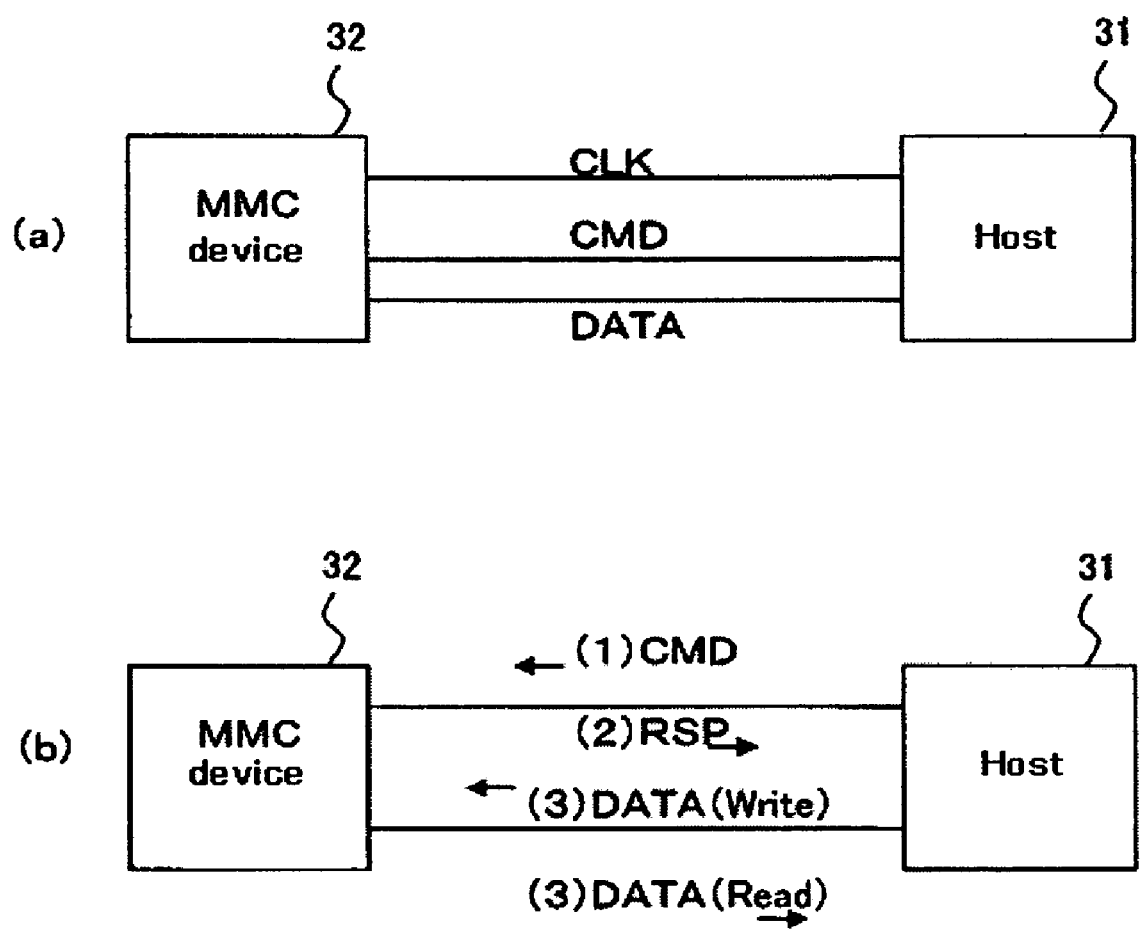
FIGS. 3(a), 3(b) are diagrams each illustrating the conventional MMC protocol.

As described above, in the data processing system according to this embodiment, the ATA protocol is implemented on the MMC bus. The MMC protocol will be briefly described with reference to FIGS. 3(a) and 3(b). A basic MMC bus has 7 pins, and carries out communications according to a clock on a clock pin. The MMC bus comprises one data pin (data line), one command pin (a command line), three power supply pins, and one reserved pin. The data pin and the command pin are bidirectional pins, through which a MMC command, a MMC response, and MMC data are transmitted by means of serial communications. FIG. 3(a) is a diagram illustrating three lines. A command line transmits a MMC command from a host 31 to a MMC device 32, and also transmits a MMC response from the MMC device 32 to the host 31. The data line transmits MMC data from the host to the device, and also transmits MMC data from the device to the host.

Data transfer by use of the MMC protocol will be briefly described with reference to FIG. 3(b). A command and data are transmitted according to a clock on the clock pin. At the time of read operation (Read, or the like), more specifically, when transmitting MMC data from the device to the host, a MMC command (CMD) issued from the host 31 to the MMC device 32 is first transmitted to the device through the command line. The MMC device 32 which has received the MMC command returns a response (RES) to the host 31 through the command line. After that, MMC data (DATA (Read)) from the MMC device 32 is output to the data line, and then the host 31 inputs the MMC data.

In addition, at the time of write operation (Write, or the like), more specifically, when transmitting MMC data from the host 31 to the MMC device 32, a MMC command (CMD) issued from the host 31 to the MMC device is first transmitted to the MMC device 32 through the command line. The MMC device 32 which has received the MMC command returns a response (RES) to the host 31 through the command line. After that, MMC data (DATA (Write)) from the host 31 is output to the data line, and then the MMC device 32 inputs the MMC data.

In the meantime, in the ATA protocol, the host 5 accesses a register group provided in the HDD 1. As a result of it, a command is executed, and data communications are carried out. In the system according to this embodiment, the MMC bus is used to implement the ATA protocol. Therefore, an ATA command, ATA user data, and the like, which are stored (or to be stored) in a register, are communicated as MMC data in the MMC protocol (MMC bus).

An instruction of the completion notification of processing is given by a MMC command from the host 5 to the HDD 1. This instruction of the processing completion notification is combined with an instruction of the processing given to the HDD 1 into one MMC command. Combining the instruction of the processing completion notification and the processing instruction into one MMC command has a great significance in the MMC protocol.

As far as the MMC protocol is concerned, a processing completion notification from the HDD is given to the host as an interruption that is an asynchronous event notification. After using a MMC command to request an asynchronous event notification, if a MMC command is newly issued, the previous MMC command is canceled. Therefore, for example, when requesting a completion notification of write processing, it is necessary to transmit a MMC command that instructs write processing, and then to transmit a MMC command that requests a processing completion notification. However, the HDD transmits the completion notification on the occurrence of an end event of the write processing, on the condition that the HDD has received the completion notification request. For this reason, if the HDD has completed the write processing before receiving a MMC command that requests a processing completion notification, the HDD cannot give the HDD the completion notification of the write processing.

As described above, by combining the instruction of processing with the instruction of the processing completion notification into one MMC command, it is possible to solve the above problem, and to effectively give an instruction of the processing completion notification in the MMC protocol. This also means that the communication control method according to this embodiment produces great effects in like manner not only in the MMC protocol, but also in protocols that follow the above processing rules.

Figure 4:
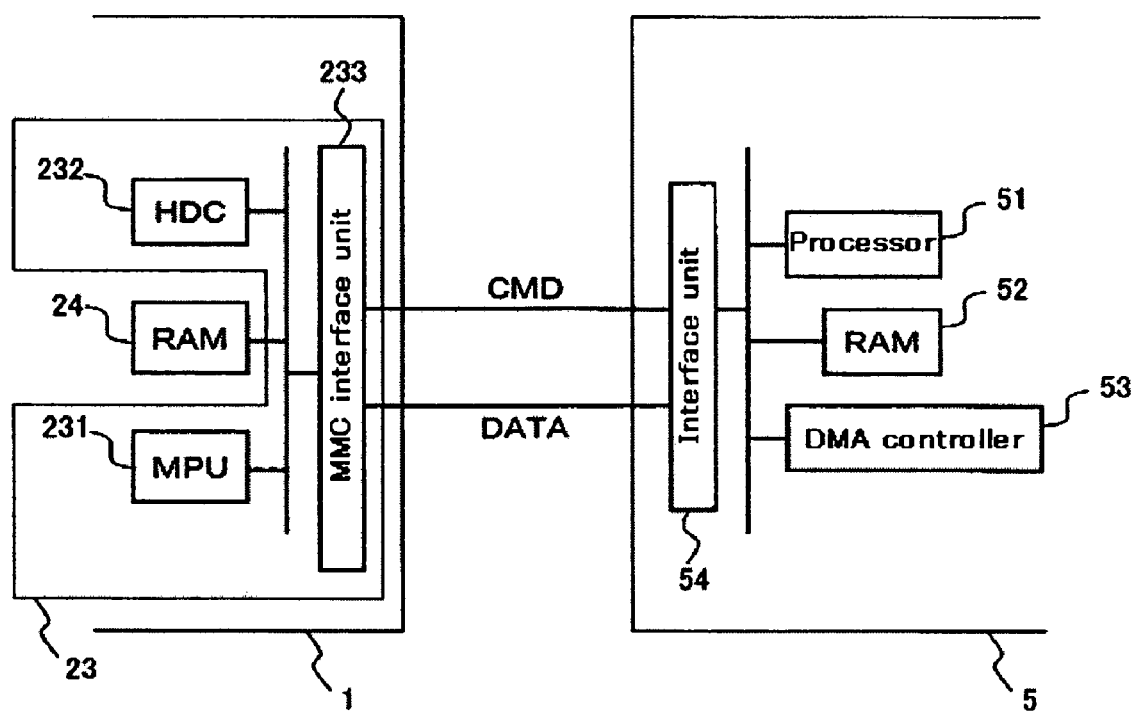
FIG. 4 is a block diagram illustrating a configuration relating to communications between a storage device and a host in a data processing system according to an embodiment of the invention.

I/O processing between the host 5 and the HDD 1 in a system according to this embodiment will be described as below. Incidentally, as described above, this mode may also be applied to processing other than the I/O processing. FIG. 4 is a block diagram schematically illustrating how communications between the HDD 1 and the host 5 are controlled. The HDD 1 comprises: a MPU 231 as an example of a control unit, which operates according to a microcode, and which performs communication control; a HDC 232 that executes processing required for communications with the host and required for data transfer with an internal circuit; a RAM 24 for storing data; and a MMC interface unit 233 that is an example of a transmission unit and of a receiving unit. The MMC interface unit 233 has functions of: communicating with the host according to the MMC protocol; and interfacing with processing in the HDD, which is based on the ATA protocol. The MMC interface unit 233 may be implemented, for example, in the MPU/HDC 23.

On the other hand, the host 5 comprises: a processor 51 as an example of a control unit, which executes processing according to a program; a RAM 52 that is an example of a memory for storing data; a DMA controller 53 that controls and executes DMA data transfer; and an interface unit 54 that is an example of a transmission unit and a receiving unit. The interface unit 54 communicates with the MMC interface unit 233 in the HDD 1 according to the MMC protocol.

In the first place, a Data-in protocol used when transmitting data from the HDD 1 to the host 5 will be described with reference to FIGS. 5, 6, and 7. Here, as an example of typical Data-in processing, read processing of reading user data stored in the HDD will be described. In addition, what will be described is an example in which if a completion notification of read processing is requested, the processor of the host enters the power save mode.

Figure 5:
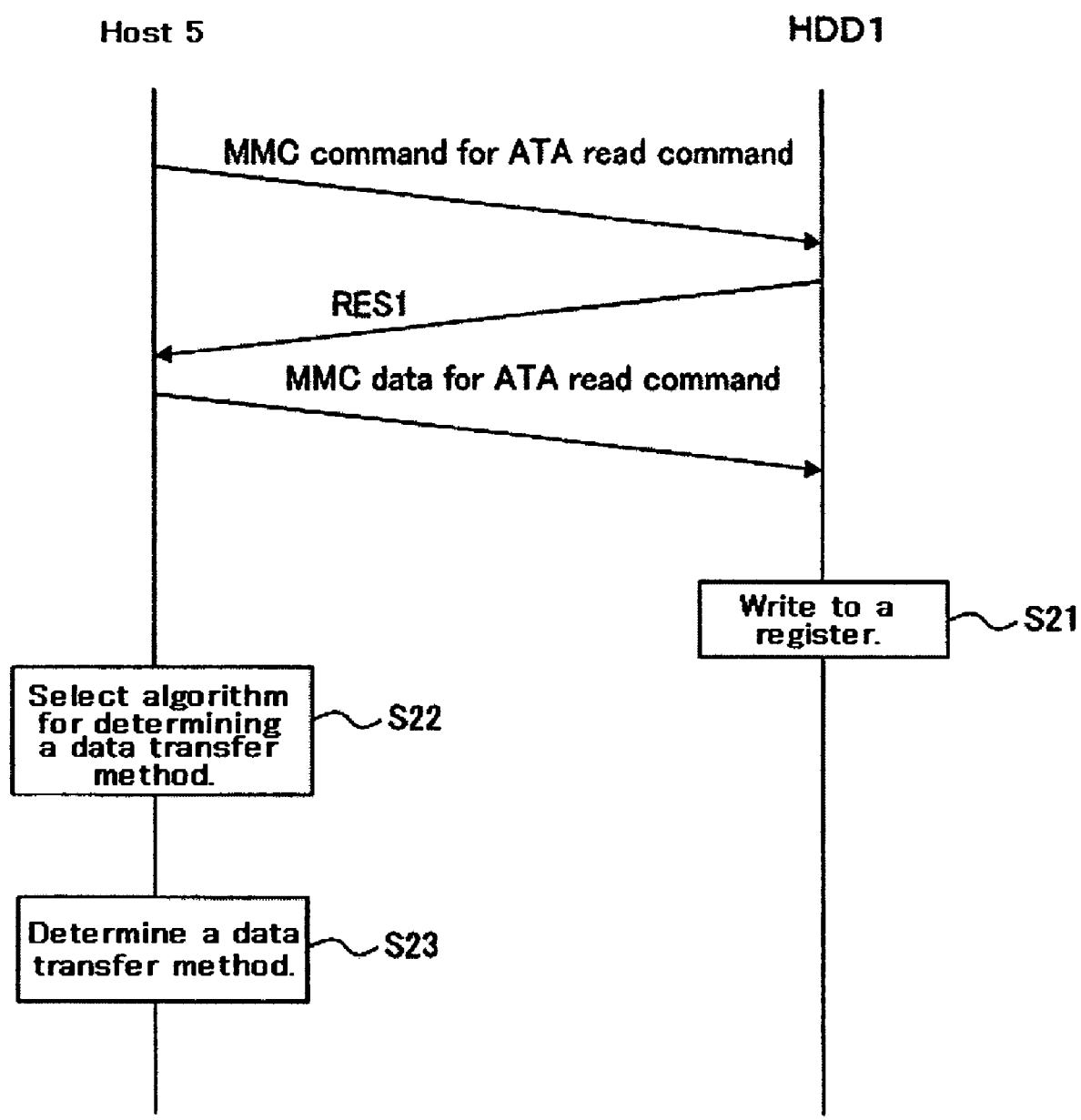
FIG. 5 is a sequence diagram illustrating data communications between a host and a HDD relating to read processing.
Figure 6:
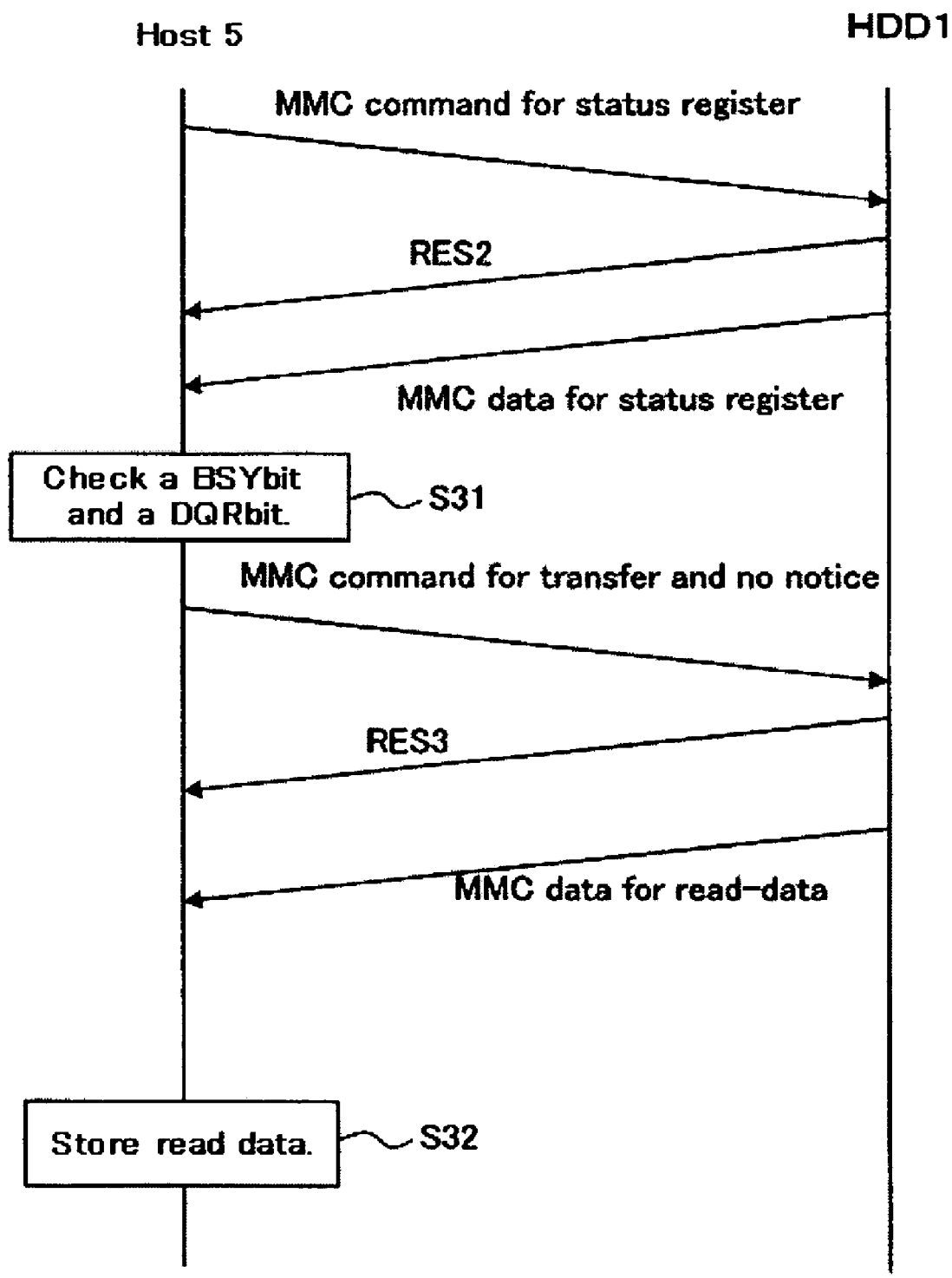
FIG. 6 is a sequence diagram illustrating data communications between a host and a HDD for a case where a polling method is adopted in read processing.

With reference to FIG. 5, a MMC command (MMC Command for ATA read command) is transmitted from the host 5 to the HDD 1. In this case, the MMC command instructs, for example, to write an ATA command for read processing to a register (task file register) formed in the HDC 231. The MMC command includes an I/O address of the register and a write command (this means writing to the register). The processor 51 generates an instruction to be included in the MMC command. Then, the interface unit 54 generates a MMC command that includes the instruction, and transmits the MMC command to the HDD 1. The MMC command is transmitted to the MPU 231 through the MMC interface unit 233. The MPU 231 then instructs the MMC interface unit 233 to return a response. The MMC interface unit 233 generates a response (RES 1), and then transmits the response to the host 5.

On the receipt of the response from the HDD 1, the host 5 transmits to the HDD 1 the MMC data (MMC data for ATA read command) that includes command data to be stored in the register of the HDD 1. To be more specific, the processor 51 prepares command data to be written to the task file register; and according to the instruction of the processor 51, the interface unit 54 generates and transmits MMC data including the command data generated by the processor 51. The command data to be written includes a start address of read and the number of read sectors. The MMC interface unit 233 receives the MMC data from the host 1, and then transmits command data included in the MMC data to the HDC 232. The HDC 232 writes the acquired command data to the task file register (S21).

The host 5 determines a data transfer method. The host 5 determines whether or not to request the HDD 1 to transmit a completion notification of I/O processing to the host. In this example, if the completion notification of I/O processing is not requested, the host 5 executes read processing by polling. The host 5 first selects algorithm for determining whether or not to request the completion notification of I/O processing (S22). The algorithm described above, such as the algorithm based on the processing time and the power consumption, may be used. After selecting the algorithm, the host 5 determines, according to the algorithm, whether or not to request the completion notification of I/O processing (S23). The algorithm, and whether or not to request the completion notification of I/O processing, are determined by the processor according to a program.

If the determination in the S23 shown in FIG. 5 is data transfer from the HDD 1 to the host 5 by polling without requesting the completion notification of I/O processing, subsequent processing will be described with reference to FIG. 6. As shown in FIG. 6, the host 5 uses a MMC command to read out data stored in a register of the HDD 1. To be more specific, the host 5 reads out a BSYbit and a DRQbit of a status register (S31). This processing is repeated until the BSYbit becomes 0 and the DRQbit becomes 1. Here, if the BSYbit is 1, this shows that the HDD 1 is operating for some purpose, and accordingly read/write from/to other registers are disabled. In the meantime, if the DRQbit is 1, the HDD 1 is in a state in which data transmission may be performed at the time of executing a command that includes data transfer.

When reading data from a register, the processor 51 of the host 5 generates a request to read the data from the status register. The interface unit 54 generates a MMC command (MMC command for status register) including the request, and then transmits the MMC command to the HDD 1. On the receipt of the MMC command, the MMC interface unit 233 of the HDD 1 transmits its contents to the MPU 231. After that, the MMC interface unit 233 generates a response (RES 2) in response to a command from the MPU 231, and then transmits the response to the host 5. Moreover, the MMC interface unit 233 acquires data stored in the status register, and then transmits the data to the host 5 as MMC data (MMC data for status register).

As soon as the BSYbit becomes 0 and the DRQbit becomes 1, the host 5 generates a MMC command (MMC command for transfer and no notice) that includes a request to transfer read data, and an instruction not to notify of the completion of I/O processing. Then, the host 5 transmits the MMC command to the HDD 1. To be more specific, the processor 51 generates an instruction to transfer read data (an instruction to start I/O processing), and an instruction not to notify of the completion of I/O processing, and then transmits the instructions to the interface unit 54. The interface unit 54 generates one MMC command by combining the instruction to transfer read data with the instruction not to notify of the completion of I/O processing, and then transmits the MMC command to the HDD 1.

The MMC command includes, for example, a 1-bit flag indicating whether or not to request the completion notification. By setting the flag bit at 1 or 0, the host 5 may instruct the HDD 1 as to whether or not to return the completion notification. Further, if the MMC command includes, for example, an I/O address at which read data is stored, and a field indicating that this processing is reading from the HDD 1, the MMC command may be used to instruct the HDD 1 to transfer read data.

On the receipt of the MMC command, the HDD 1 returns a response (RES 3) to the host 5, and then starts transfer of read data. To be more specific, the MPU 231 acquires through the MMC interface unit 233 the instruction to transfer read data, and the instruction not to notify of the completion of I/O processing (no notification), so as to control transfer processing of read data. The MMC interface unit 233 acquires read data from the HDC 232, and generates MMC data (MMC data for read-data) including the read data, and then transmits the MMC data to the host 5. In the host 5, the read data included in the MMC data received by the interface unit 54 is stored in the RAM 52 under the control of the processor 51 (S32). As a result of the processing described above, the ATA command of read processing is completed. Here, the length of time required for the data transfer by polling Tpioblk is equivalent to the length of time from when the MMC command (MMC command for transfer and no notice) is transmitted to the HDD 1 until the RAM 52 stores the read data.

Figure 7:
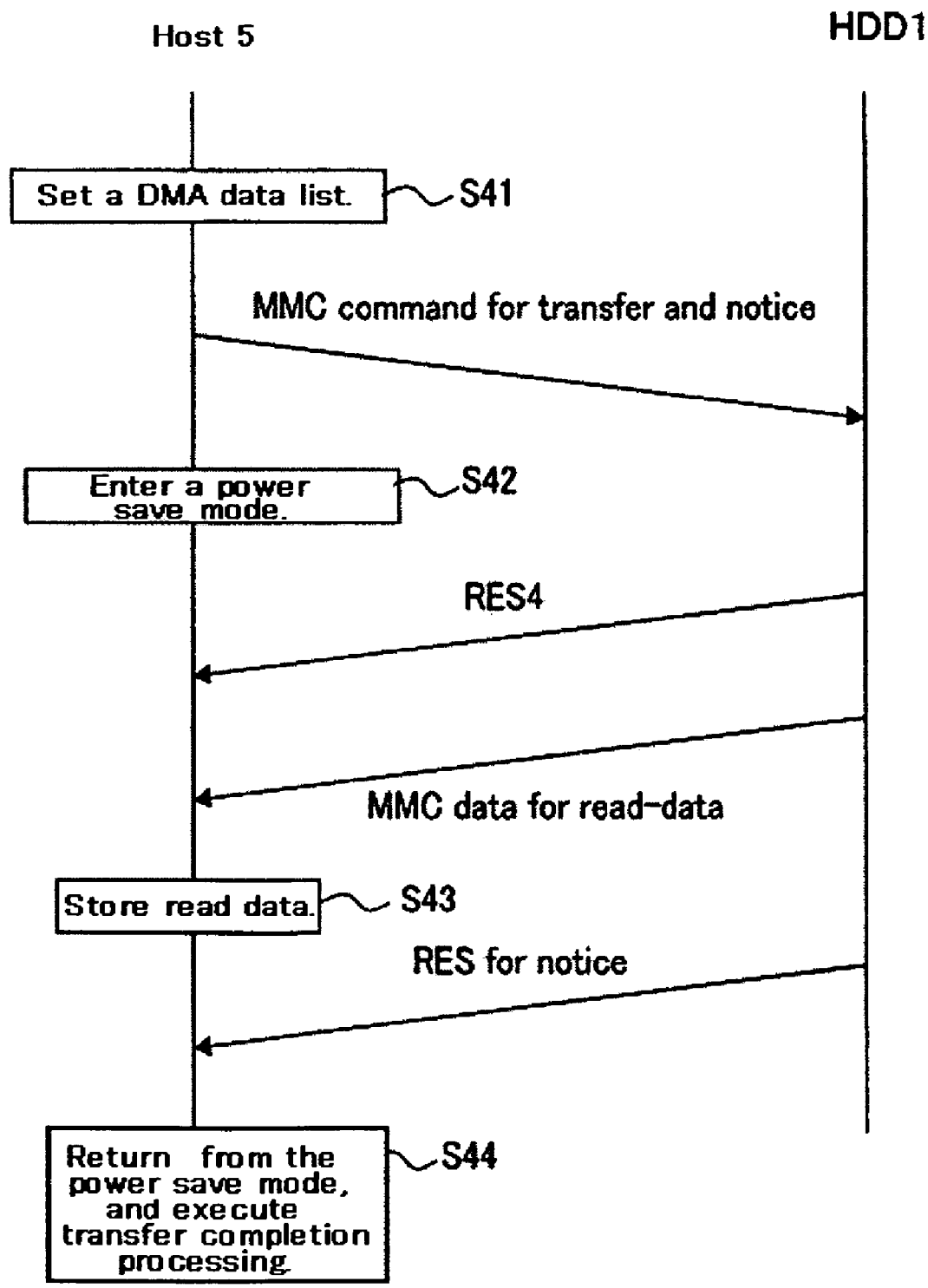
FIG. 7 is a sequence diagram illustrating data communications between a host and a HDD for a case where a DMA data transfer method is adopted in read processing.

What will be described next with reference to FIG. 7 is processing performed after the S23 in the case where it is determined in the S23 in FIG. 5 that the host requests the completion notification of I/O processing. The processor 51 gives the DMA controller 53 a data list used for DMA transfer (S41). Moreover, the processor 51 generates an instruction to transfer read data (an instruction to start I/O processing), and a request to notify of the completion of I/O processing, and then transmits them to the interface unit 54. The interface unit 54 generates one MMC command (MMC command for transfer and notice) by combining the instruction to transfer read data with the request to notify of the completion of I/O processing, and then transmits the MMC command to the HDD 1. The MMC command may have fields similar to those used in the polling method. The fields include: an I/O address; an instruction to read/write from/to the HDD 1; and a flag indicating whether or not to request the completion notification of processing.

In the host 5, after transmitting the MMC command including the request of the completion notification of I/O processing, the processor 51 enters the power save mode that is in an interruption waiting state (S42). It is to be noted that after passing the required data to the interface unit 54, the processor 51 may enter the power save mode at any timing. From the viewpoint of the reduction in power consumption, it is desirable to enter the power save mode at earlier timing. On the receipt of the MMC command, the HDD 1 returns a response (RES 4) to the host 5, and then starts transfer of read data. To be more specific, the MPU 231 acquires through the MMC interface unit 233 the instruction to transfer read data, and the request to notify of the completion of I/O processing, so as to control transfer processing of read data. The MMC interface unit 233 acquires read data from the HDC 232, and generates MMC data (MMC data for read-data) including the read data, and then transmits the MMC data to the host 5.

The read data included in the MMC data received from the HDD 1 is passed through the DMA controller 53 from the interface unit 54, and is then stored in the RAM 52, by means of DMA data transfer that does not use the processor 51 (S43). On the completion of the transfer of the read data from the HDD 1, the HDD 1 transmits a completion notification of read processing to the host 5. The completion notification is transmitted from the HDD 1 to the host 5 as a response passed through the command line. According to a command from the MPU 231, the MMC interface unit 233 generates a response (RES for notice) including the completion notification acquired from the MPU 231, and then transmits the response to the host 5 through the command line.

On the receipt of the response, the processor 51 returns from the power save mode, and executes transfer completion processing for the DMA controller 53 (S44). As a result of the processing described above, the ATA command of read processing is completed. Here, the processing time of the command as a whole for the case where the completion notification of I/O processing is used (T1=(Tdma+Tdmablk)) is equivalent to the length of time from when the data list used for DMA transfer is given to the DMA controller 53 (S41) until the transfer completion processing is executed for the DMA controller 53 (S44). Incidentally, in the communications that follow the MMC protocol, other processing such as CRC processing is also executed. However, to clarify characteristics of this embodiment, the description thereof will be omitted.

What was described above was the case where the read processing has been normally completed. However, there is also a case where the read processing ends as a result of the occurrence of an error during the execution of the processing. For this reason, the processing completion notification transmitted by the HDD 1 indicates the reason why the processing ends as well as the fact that the processing ends. To be more specific, a response is provided with a field indicating the reason why the processing ends. Including, in the response, not only data of the status register in the HDD 1 but also data of an error register makes it possible to notify of not only the normal end but also a kind of error in the event that an error occurs. If the response of MMC does not include the end reason, the host 5 is later required to transfer MMC data to know the end reason. However, including the end reason in the response of MMC eliminates the need for the above processing, enabling an improvement in processing efficiency.

Figure 8:
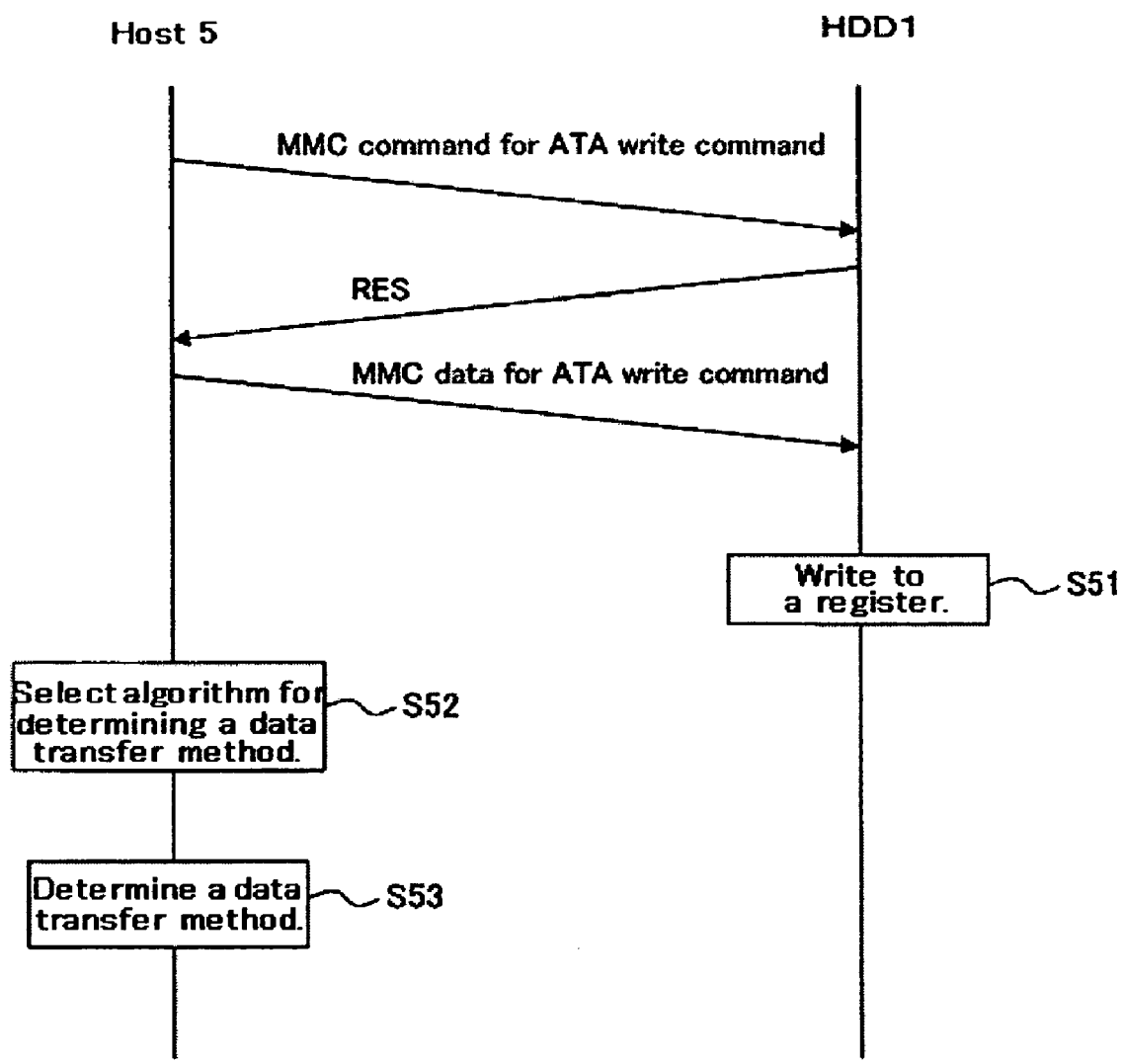
FIG. 8 is a sequence diagram illustrating data communications between a host and a HDD relating to write processing.

Subsequently, a Data-out protocol used when transmitting data from the host 5 to the HDD 1 will be described with reference to FIGS. 8, 9, and 10. Here, as an example of typical Data-out processing, write processing of writing user data to the HDD 1 will be described. In addition, what will be described is an example in which if the completion notification of write processing is requested, the processor 51 of the host 5 enters the power save mode. Incidentally, to avoid duplicated description, detailed description of processing in the HDD 1 and that in the host 5 will be partially omitted.

To begin with, the host 5 issues an ATA command for write processing. Then, the HDD 1 writes command data for write processing to a task file register in the HDD 1 using a MMC command (MMC command for ATA write command) and MMC data (MMC data for ATA write command) (S51). The command data includes a write address and the number of sectors. It is to be noted that because the write processing of writing the command data to the register is similar to the read processing described above, the detailed description thereof will be omitted. Next, the host 5 selects the algorithm for determining a data transfer method (S52). Then, according to the selected algorithm, the host 5 selects either a processing completion notification method or a polling method (S53).

Figure 9:
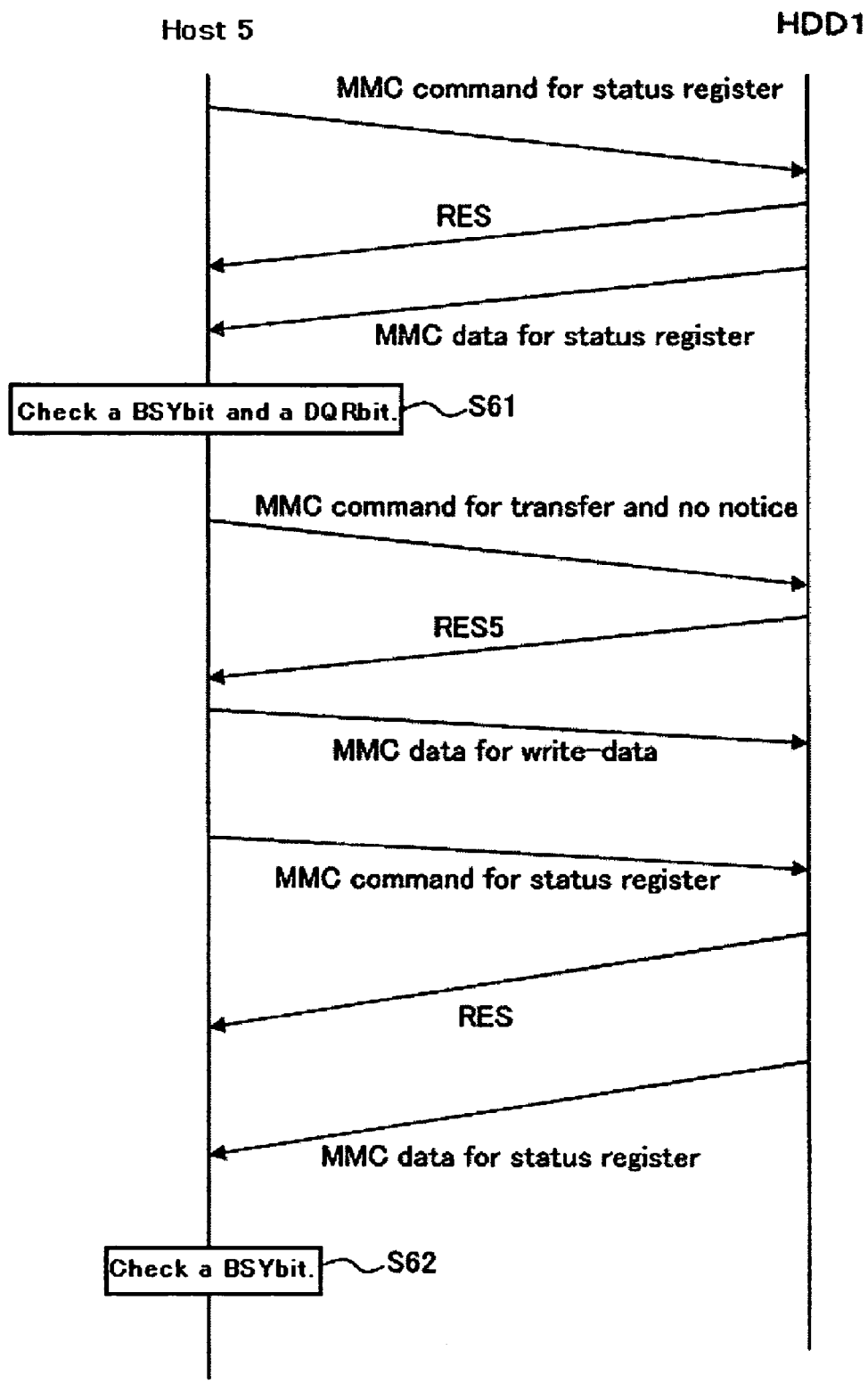
FIG. 9 is a sequence diagram illustrating data communications between a host and a HDD for a case where the polling method is adopted in write processing.

In the first place, what will be described with reference to FIG. 9 is processing performed after the S53 in the case where the polling method is selected in S53 in FIG. 8. The host 5 reads out data in the register of the HDD 1 by use of MMC data (MMC data for status register) that is a response of MMC command (MMC command for status register). To be more specific, the host 5 reads out the BSYbit and the DRQbit of the status register (S61). This processing is repeated until the BSYbit becomes 0 and the DRQbit becomes 1. As soon as the BSYbit becomes 0 and the DRQbit becomes 1, the host 5 generates a MMC command (MMC command for transfer and notice) that includes an instruction to transfer write data, and an instruction not to notify of the completion of I/O processing. Then, the host 5 transmits the MMC command to the HDD 1.

On the receipt of a response (RES 5) from the HDD 1, the host 5 starts transferring write data to the HDD 1 using MMC data (MMC data for write-data), and the HDD 1 then receives this. On the completion of the transfer of the write data, the processing of the MMC command ends.

On the completion of the transfer of the write data, the host 5 reads out the BSYbit of the status register of the HDD by use of the MMC data (MMC data for status register) that is the response of the MMC command (MMC command for status register) (S62). Because the read processing of reading the status register was described above, the detailed description thereof will be omitted. The host 5 repeats reading the status register until the BSYbit becomes 0. Here, if a write cache function is in an ON state, the BSYbit becomes 0 when the HDD 1 finishes receiving all write data from the host 5. On the other hand, if the write cache function is in an OFF state, the BSYbit becomes 0 when writing of write data to the magnetic disk 11 ends. As soon as the host acknowledges that the BSYbit has become 0, the ATA command of write processing ends.

In the next place, what will be described with reference to FIG. 10 is processing performed after the S53 in the case where the host 5 selects the processing completion notification method in the S53 shown in FIG. 8. The host 5 gives the DMA controller 53 a data list used for DMA transfer (S71). Moreover, the host 5 generates an instruction to transfer write data (an instruction to start I/O processing), and a request to notify of the completion of I/O processing, and then transmits them to the HDD 1 as one MMC command (MMC command for transfer and notice). After that, the processor 51 enters the power save mode (S72). The timing of entering the power save mode is similar to that in the above-mentioned example of Data-in. On the receipt of a response (RES 6) from the HDD 1, the host 5 starts transferring write data to the HDD 1 by means of DMA using the MMC data (MMC data for write-data).

As soon as the write processing ends, the HDD 1 transmits a processing completion notification to the host 5 using a response of MMC (RES for notice). If the write cache function is in the ON state, the HDD 1 transmits a completion notification of I/O processing to the host when the HDD 1 finishes receiving all write data from the host 5. On the other hand, if the write cache function is in the OFF state, the HDD 1 transmits a completion notification of I/O processing to the host when writing of write data to the magnetic disk 11 ends. On the receipt of the completion notification of I/O processing from the HDD 1, the processor 51 returns from the power save mode, and then executes the transfer completion processing for the DMA controller 53 (S73). As a result of the processing described above, the ATA command of write processing is completed.

Incidentally, the above describes how the present invention is applicable, and is not intended to limit the scope of the present invention to the embodiments cited above. Those skilled in the art will be able to easily make modifications, additions and alternations to each element of the above embodiments within the scope of the preset invention. For example, the present invention may be applied to various kinds of storage devices. The present invention may be applied to various kinds of storage devices, each of which uses a different kind of medium and a different medium mounting method (for example, semiconductor storage devices such as a flash memory and an EEPROM, magnetic disk storage devices, optical disk storage devices, and the like). Moreover, the present invention may also be applied to a system comprising the above storage device. In another case, the present invention may be applied not only to a storage device for writing/reading data, but also to a storage device for performing only one of write/read processing. Furthermore, the present invention may be applied not only to MMC and ATA but also to a case where another protocol is implemented on one protocol.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A communication method between a host and a storage device, the communication method comprising:
   transmitting, from the host to the storage device, a first instruction to perform a first processing by the storage device;
   the storage device communicating to the host an amount of transmitted data;
   based on the amount of transmitted data, determining by the host whether or not the storage device is to transmit a completion notification of the processing to the host; and
   transmitting, from the host to the storage device, a second instruction as to whether or not the storage device is to transmit the completion notification to the host, the second instruction being according to the determination by the host,
   wherein the first instruction to perform the processing, and the second instruction as to whether or not to transmit the completion notification, are included in one command when the instructions are transmitted from the host to the storage device; and
   wherein on the basis of an expected processing time of the first processing by the storage device estimated from the amount of transmitted data, the host determines whether or not to request the completion notification.

2. The communication method according to claim 1, wherein if the host instructs the storage device to transmit the completion notification, the storage device transmits the completion notification of the processing to the host.

3. The communication method according to claim 1, wherein the completion notification includes an end reason of the processing.

4. The communication method according to claim 1, wherein the processing is I/O processing, and the processing time is determined according to the amount of transferred data.

5. The communication method according to claim 1, wherein the storage device is a hard disk drive.

6. A host that performs communications with a storage device, the host comprising:
   a control unit configured to determine whether or not the storage device is to transmit, to the host, a completion notification of processing to be performed by the storage device, wherein the determination is based on processing to be performed by the host;
   a transmission unit configured to transmit, to the storage device, a first instruction to perform the processing, and a second instruction as to whether or not to transmit the completion notification according to the determination by the control unit; and
   a receiving unit configured to receive the completion notification transmitted from the storage device according to an instruction to transmit the completion notification, wherein the transmission unit includes the first instruction to perform the processing, and the second instruction as to whether or not to transmit the completion notification in one command when transmitting the instructions; and wherein the control unit is configured to determine whether or not the completion notification is to be transmitted based on comparison of a first power consumption in the host required to perform the data transmission and receiving utilizing completion notification, and a second power consumption in the host required to perform the data transmission and receiving utilizing polling.

7. The host according to claim 6, wherein the completion notification includes an end reason of the processing.

8. The host according to claim 6, wherein the processing is I/O processing, and if it is requested to transmit the completion notification of the processing, a DMA data transfer method is used, whereas if it is not requested to transmit the completion notification of the processing, a polling method is used.

9. The host according to claim 6, wherein if it is requested to transmit the completion notification of the processing, the control unit enters a power save mode under predetermined conditions, and in response to the completion notification, the control unit returns from the power save mode.

10. A host that performs communications with a storage device, the host comprising:
  a control unit configured to determine whether or not the storage device is to transmit, to the host, a completion notification of processing to be performed by the storage device, wherein the determination is based on processing to be performed by the host;
  a transmission unit configured to transmit, to the storage device, a first instruction to perform the processing, and a second instruction as to whether or not to transmit the completion notification according to the determination by the control unit; and
  a receiving unit configured to receive the completion notification transmitted from the storage device according to an instruction to transmit the completion notification,
  wherein the transmission unit includes the first instruction to perform the processing, and the second instruction as to whether or not to transmit the completion notification in one command when transmitting the instructions, and
  wherein the control unit is configured to determine whether or not the completion notification is to be transmitted according to an execution time of the host required to process an amount of data transmitted from the storage device.

11. A system including a host and a storage device that communicate with each other, the system comprising:
  a host that:
    determines whether or not the storage device is to transmit, to the host, a completion notification of processing to be performed by the storage device, wherein the determination is based on the processing to be performed by the storage device or the host; and
    transmits, to the storage device, a first instruction to perform the processing, and a second instruction as to whether or not to transmit the completion notification according to the determination; and
  a storage device that executes the instructed processing, and that transmits the completion notification to the host if the host instructs to transmit the completion notification,
  wherein whether or not to transmit the completion notification is determined according to the power consumption in the host required to perform the data transmission and reception or according to the execution time of the host required to execute the processing, wherein the execution time or the power consumption are based upon data transmitted to the host from the instructed processing, and
  wherein the host includes the first instruction to perform the processing, and the second instruction as to whether or not to transmit the completion notification in one command when transmitting the instructions.

12. The system according to claim 11, wherein the processing is I/O processing, and if it is requested to transmit the completion notification of the processing, a DMA data transfer method is used, whereas if it is not requested to transmit the completion notification of the processing, a polling method is used.

* * * * *